Patented July 16, 1946

2,404,003

UNITED STATES PATENT OFFICE 2,404,003

DETERGENT COMPOSITION

Frank J. Soday, Swarthmore, Pa., assignor to The United Gas Improvement Company, a corporation of Pennsylvania No Drawing. Application March 14, 1942, Serial No. 434,789

5 Claims. (Cl. 252—132)

This invention relates to new compositions of matter.

More particularly, this invention relates to new compositions of matter comprising a soap or detergent containing one or more tolyl ethyl alcohols as a perfuming and/or sealing agent.

It is an object of the present invention to provide a stable perfuming and/or sealing agent for soaps and detergents in general comprising one or more tolyl ethyl alcohols. Another object of the invention is the provision of a method whereby bar or cake soap may be effectively sealed against the loss of moisture, and consequent deterioration, by the addition thereto of one or more tolyl ethyl alcohols. A further object of the invention is the provision of new perfuming agents for soap possessing unusually stable characteristics. Other objects and advantages of the invention will be apparent to those skilled in the art upon an inspection of the specification and claims.

Tolyl ethyl alcohols are stable organic compounds having unusually desirable odors. Their structure may be represented as follows:

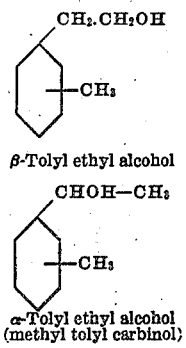

β-Tolyl ethyl alcohol

α-Tolyl ethyl alcohol
(methyl tolyl carbinol)

These alcohols may be obtained among other ways, by the addition of a hydrogen halide, such as hydrogen chloride or hydrogen bromide, to ortho methyl styrene, meta methyl styrene, or para methyl styrene, or to a mixture containing two or more nuclearly-substituted methyl styrenes, followed by the hydrolysis of the tolyl ethyl halide obtained.

The latter step may be carried out, among other ways, by the use of an aqueous solution of an inorganic alkali, such as sodium or potassium hydroxide, carbonate, or bicarbonate. The corresponding tolyl ethyl alcohols are obtained in excellent yields by this process.

If the addition of the hydrogen halide to the methyl styrene, or mixture of methyl styrenes, is carried out at normal or reduced temperatures, followed by hydrolysis, the alpha form of the tolyl ethyl alcohol, or alcohols, predominates in the product.

Thus, the addition of hydrogen chloride to a light oil methyl styrene fraction at 0° C., followed by the hydrolysis of the hydrochloride obtained, results in the production of a tolyl ethyl alcohol, or mixture of tolyl ethyl alcohols, comprised almost exclusively of the alpha form.

If the addition of the hydrogen halide to methyl styrene is carried out at temperatures substantially above room temperature, followed by hydrolysis of the methyl styrene hydrohalide formed, increasing proportions of the beta-isomer will be obtained.

Thus, the addition of hydrogen bromide to a light oil methyl styrene fraction at a temperature of 100° C., or above, followed by hydrolysis, results in the production of a tolyl ethyl alcohol, or mixture of tolyl ethyl alcohols, in which the beta-isomer will be present in substantial, or preponderating, proportions.

Furthermore, the addition of a hydrogen halide to methyl styrene in the presence of certain directing catalysts, such as the organic peroxides for example benzoyl peroxide, lauryl peroxide, isoprene peroxide, and ascaridole, followed by hydrolysis, largely increases the proportion of the beta-alcohol formed.

The addition of hydrogen bromide to a light oil methyl styrene fraction in the presence of 2% by weight of benzoyl peroxide at a temperature of 50° C., followed by hydrolysis results in the production of a tolyl ethyl alcohol, or mixture of tolyl ethyl alcohols, in which the beta-isomer is present in substantial, or preponderating, proportions.

This may be summarized by stating that the addition of hydrogen halide to methyl styrene at low temperatures favors the production of the alpha-isomer, while the use of elevated temperatures and/or a directing catalyst favors the production of the beta-isomer. By a proper variation of the reaction temperature, and/or the use of a directing catalyst, a tolyl ethyl alcohol, or a mixture of tolyl ethyl alcohols, containing almost any desired ratio of alpha and beta isomers may be obtained at will.

This is of very considerable practical importance, particularly from the standpoint of the use of such alcohols as perfuming agents for soaps and detergents, as the alpha and beta isomers possess different odors. Thus, the alpha-tolyl ethyl alcohols possess a very agreeable rose odor with a definite leafy undertone. The beta-tolyl ethyl alcohols, on the other hand possess a richer rose odor with a slight phenolic undertone.

The position of the methyl group also has a very considerable influence upon the odor of the tolyl ethyl alcohol. Thus, beta-ortho tolyl ethyl alcohol has a very faint phenolic odor, beta-meta tolyl ethyl alcohol has a full rose odor, and beta-para tolyl ethyl alcohol has a rather strong odor of anise, with a light shade of caraway.

By the use of the methods disclosed herein, tolyl ethyl alcohols or mixtures of tolyl ethyl alcohols possessing a wide range of odors may be prepared readily.

The nuclearly-substituted methyl styrene, or mixtures containing two or more nuclearly-substituted methyl styrenes, employed in the process may be obtained from any desired source, such as by the use of various synthetic methods.

A particularly desirable source of nuclearly-substituted methyl styrenes is the light oil obtained in the manufacture of combustible gas by processes involving the pyrolysis of petroleum hydrocarbons for example, crude oil or any desired fraction or fractions thereof, such as in the presence of steam and at average gas-making set temperatures above approximately 1100° F. Methyl styrene fractions obtained therefrom may contain one, or more than one of the nuclearly substituted methyl styrene fractions depending, among other things, upon the boiling range of the fraction selected.

In general, I prefer to employ a mixture of meta, para, and ortho tolyl ethyl alcohols (the designations referring to the position of the methyl group on the ring with respect to the alcohol side chain) in which the meta isomer predominates due to the pronounced true rose odor of such mixture, although mixed alcohols in which the para isomer predominates also possess very desirable odors.

Mixtures of tolyl ethyl alcohols containing from 50 to 75% of the meta form, from 20 to 50% of the para form, and from 1 to 10% of the ortho form possess very desirable odors. Particularly desirable results are obtained when mixtures of methyl styrene alcohols containing from 60 to 70% of the meta form, from 25 to 40% of the para form, and from 2 to 8% of the ortho form are employed. These preferred mixtures may be obtained readily by a proper adjustment of the boiling range of the light oil methyl styrene fractions employed in the production of mixed alcohols.

As pointed out previously, tolyl ethyl alcohols of the type more particularly described herein are well adapted for use as addition agents for soap and similar detergent materials. Tolyl ethyl alcohols, when added to soap or similar products such as synthetic detergents and the like, serve not only to impart desirable odors thereto, but also assist in sealing the pores of such materials to prevent efflorescence and deterioration.

The addition of one or more tolyl ethyl alcohols of the type described to bar soap as an odorant has been found to be particularly advantageous because of the unusually stable nature of these materials. A large number of perfumes now being used for this purpose suffer from a lack of stability, and when added to soap often result in the development of an undesirable odor after any extended period of storage thereof. This is primarily due to oxidation or hydrolysis of the odorant and its conversion into materials having undesirable or unpleasant odors.

Thus, for example, the exposure to light and air of soaps containing such odorants as phenyl acetaldehyde, benzaldehyde, anisic aldehyde, citral, lemon oil, citronellal, hydroxy citronellal, vanillin, and heliotropin, results in the development of disagreeable and unpleasant odors by oxidation, or by the action of other constituents in the soap, such as water.

Furthermore, certain of these odorants, such as, for example, vanillin and others having phenolic constituents, develop a dark color upon exposure to light and air, which is generally undesirable in soap and soap products.

Tolyl ethyl alcohols of the type described herein possess none of these undesirable properties. They are completely stable and resist the action of light and air for relatively long periods of time. They impart pleasant flowery or fruity odors to soap and similar products, the exact odor imparted to the soap being dependent upon the exact composition of the tolyl ethyl alcohol, or mixture of tolyl ethyl alcohols, employed. They have, therefore, been found to be highly desirable as odorants for such materials.

The reduction in quality of bar soap in the industry due to efflorescense represents a very considerable economic loss. Bar soap which has lost water by efflorescence presents an unsightly appearance, becoming chalk-white and opaque in the case of white soap. In colored soap, the effect is even more pronounced as the area of efflorescence is marked by an opaque, off-colored zone. The addition of tolyl ethyl alcohols of the type described herein to a soap or a soap product serves to effectively seal the pores on the surface thereof and retards the loss of water by efflorescence. The property of preventing efflorescence and deterioration, when combined with the highly advantageous odorizing properties of these derivatives, make them highly suitable for use in the soap industry.

The tolyl ethyl alcohols of the type described may be incorporated in soap in any desired manner. The quantity used will depend upon a number of factors, but quantities in the range of 0.05% to 5% by weight may be regarded as typical. The alcohol or alcohols may be used as such, or in suitable mixtures thereof, or in combination with other perfumes or additive agents.

Thus, for example, a mixture of 98 parts by weight of dried aged soap chips and 2 parts by weight of a tolyl ethyl alcohol of the type described may be thoroughly mixed and fed into a milling machine. The milled soap then may be plodded, stamped, and molded. The bar soap thus obtained will be found to possess a very agreeable odor and to be unusually resistant to efflorescence.

In addition to its use in bar soap, tolyl ethyl alcohols of the type described herein also may be employed to advantage in other types of soap, such as soap in solid particle form, for example, flake, chip, powder, or bead forms of soap. In addition, they may be incorporated in synthetic detergents, such as sodium lauryl sulfonate and alkyl benzene sulfonate sodium salt.

The soaps and synthetic detergents to which this invention relates may be conveniently classified under the generic term "organic detergents," illustrative formulae for which are as follows:

RCOOM in which R stands for alkyl and M stands for an alkali metal such as sodium and potassium. Examples are alkali metal salts of fatty acids such as soaps.

$(SO_3)_xRCOOM$ in which R stands for $C_nH_{2n+1}$, M stands for an alkali metal such as sodium and potassium and $x$ stands for any integer. Examples are alkali metal salts of sulfonated fatty acids.

$SO_3ROH$ in which R stands for $C_nH_{2n+1}$. Examples are sulfonated fatty alcohols.

$SO_3MR_1R_2$ in which M stands for an alkali metal such as sodium and potassium, $R_1$ stands for an aryl group and $R_2$ stands for an alkyl group. Examples are alkali metal salts of sulfonated alkylated aromatic compounds.

Generally speaking, detergent compounds contain more than 15 carbon atoms. Thus soaps used as detergents are generally speaking alkali metal salts of fatty acids containing more than 15 carbon atoms, examples of which are the sodium and potassium salts of palmitic, oleic and stearic acids.

Therefore, for the purposes of the claims the term "detergent" is employed generically to cover all compounds of the foregoing character.

While compounds and products of a particular nature have been specifically described, it is to be understood that these are by way of illustration. Therefore, changes, omissions, additions, substitutions, and/or modifications might be made within the scope of the claims without departing from the spirit of the invention, which is intended to be limited only as required by the prior art.

This application is a continuation-in-part of my copending application Serial Number 290,501, filed August 16, 1939, now Patent 2,293,774, issued August 25, 1942.

I claim:

1. A detergent composition comprising a mixture of tolyl ethyl alcohol and an alkali metal soap, said tolyl ethyl alcohol being present in said mixture in a proportion between 0.05 and 5% by weight of said soap.

2. A detergent composition, comprising alkali metal soap in admixture with from 0.05 to 5% by weight of a plurality of tolyl ethyl alcohols, said plurality of tolyl ethyl alcohols comprising from 50 to 75% of meta tolyl ethyl alcohol, from 20 to 50% of para tolyl ethyl alcohol, and from 1 to 10% of ortho tolyl ethyl alcohol.

3. A detergent composition, comprising an alkali metal soap in admixture with from 0.05 to 5% by weight of a mixture of tolyl ethyl alcohols, said mixture of tolyl ethyl alcohols containing from 60 to 70% of meta tolyl ethyl alcohol, from 25 to 40% of para tolyl ethyl alcohol, and from 2 to 8% of ortho tolyl ethyl alcohol.

4. A detergent composition, comprising a mixture of an alkali metal soap with from 0.05 to 5% by weight of tolyl ethyl alcohol in which alpha tolyl ethyl alcohol preponderates.

5. A detergent composition, comprising an alkali metal soap having admixed therewith from 0.05 to 5% by weight of tolyl ethyl alcohol which is preponderantly in the form of beta tolyl ethyl alcohol.

FRANK J. SODAY.